(12) United States Patent
Parsadayan et al.

(10) Patent No.: US 7,176,647 B2
(45) Date of Patent: Feb. 13, 2007

(54) LIGHT-EMITTING DEVICE HAVING A PHOSPHOR PARTICLE LAYER WITH SPECIFIC THICKNESS

(75) Inventors: Walter Parsadayan, Lake Forest, CA (US); Wayne C. Hom, Rancho Santa Margarita, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 276 days.

(21) Appl. No.: 10/386,758

(22) Filed: Mar. 11, 2003

(65) Prior Publication Data

US 2004/0177558 A1 Sep. 16, 2004

(51) Int. Cl.
*H02K 17/32* (2006.01)
*H02P 3/00* (2006.01)

(52) U.S. Cl. ............... 318/445; 318/266; 318/466; 49/26

(58) Field of Classification Search .......... 318/266, 318/466, 434, 445; 49/26, 352
See application file for complete search history.

(56) References Cited

U.S. PATENT DOCUMENTS

| 4,628,496 A | 12/1986 | Lee |
| 4,727,679 A | 3/1988 | Kornbrekke et al. |
| 4,916,860 A * | 4/1990 | Richmond et al. ............ 49/28 |
| 5,929,580 A * | 7/1999 | Mullet et al. ............... 318/466 |
| 6,326,751 B1 * | 12/2001 | Mullet et al. ............... 318/434 |
| 6,434,085 B1 * | 8/2002 | Nedwell ..................... 367/100 |
| 6,521,884 B1 * | 2/2003 | Breda ......................... 250/225 |
| 6,836,449 B2 * | 12/2004 | Raykhman et al. .......... 367/99 |
| 2003/0029089 A1 * | 2/2003 | Wenzl et al. ................. 49/49 |

FOREIGN PATENT DOCUMENTS

CA 2107198 A * 3/1995

OTHER PUBLICATIONS

"Gate Operators and the UL 325 Standard, Technical Data Sheet #353." DASMA, Door & Access Systems Manufacturers Association International; Operator & Electronics Division. Jul. 2001.*
DASMA Technical Data Sheet #353 GATE Operators and the UL 325 Standard.*

* cited by examiner

*Primary Examiner*—Paul Ip
(74) *Attorney, Agent, or Firm*—Fitch, Even, Tabin & Flannery

(57) ABSTRACT

A method and system for controlling the speed of security gate depending on its length is disclosed. It includes a system for determining the length of a gate that the system is working with and which automatically sets the speed of movement of the gate based on length. The system works automatically so that human intervention is not necessary to set the optimal speed once installed.

17 Claims, 5 Drawing Sheets

GATE OPERATOR WITH SPEED CONTROL
AND TORQUE CONTROL BASE
ON GATE LENGTH

US 7,176,647 B2

LIGHT-EMITTING DEVICE HAVING A PHOSPHOR PARTICLE LAYER WITH SPECIFIC THICKNESS

FIELD OF THE INVENTION

The present invention relates to control of operation of movable security barriers and more particularly to optimizing the speed with which such barriers open and close.

BACKGROUND OF THE INVENTION

The speed with which a security gate can safely open and close is dependent on the length and mass of the gate. The safe speed is inversely proportional to the length and mass of the gate. A swinging gate eight feet in length and of moderate mass can safely open and close in eight seconds. However, a gate 16 feet in length can only safety open and close in 13 seconds or more. To attempt to force a gate to open or close at speed faster than the safe speed subjects it to stress and forces that could damage the gate or injure those in the vicinity of the gate.

One of the disadvantages of a movable security gate or barrier is that every time one has to pass through it they have to wait for it to open or close. Additionally, having to go through a security gate or barrier numerous times during a short time period such as during anyone day can be tedious and frustrating since one has to stop and wait for the gate to open or close. Attempts to speed up movement of the gate can result in a dangerous situation if the gate is moving too fast. As noted above excessive speed of movement of the gate can put stress on the gate and cause it to malfunction or break. Also, excessive speed of movement for a gate can create dangerous situations that can cause injury to those in the vicinity of the gate or passing through the opening the gate covers.

In the past to avoid a security gate installation that had a gate that might be operating at an excessive speed security gate manufactures often produced gate controllers that limited the speed a gate attached to the controller to the Lowest common denominator. The lowest common denominator being the speed a gate 16 feet in Length might be able to open at. If the controller was installed with a gate 16 feet in length it was operating the gate at its maximum safe speed. However, if the controller was installed at a location with an eight feet the gate would not be operating at its optimal speed. One alternative has been to allow the speed to be adjusted upon installation of the controller with the security gate. However, this relied on the judgment of the dealer installing the system or the owner of the system. In such situations it has been found that they all tend to set the speed of movement of the gate at an excessive speed that tends to cause damage to the gate and injury to those using the system. This in turn has naturally resulted in product liability claims and other problems. Thus, to avoid these problems most security gate manufactures preset the speed the controller will operate at to one that will be safe for the intended installation or to the slowest safe speed.

Thus, what is needed is a system and method that will allow for the setting of the optimal safe speed for a security gate to operate at. Such a system and method should be fail safe and allow for the automatic setting of the fastest safe speed the particular gate the controller is being installed at can operate at.

SUMMARY

It is an objective of the present invention to provide a system and method that allows the setting of a safe speed for a gate to operate at while still operating at its optimal fastest speed. It is an additional objective to provide a system that is tamper proof, and can sense the size of the gate and set the appropriate speed of operation, based on various preset criterion.

The present invention accomplishes these and other objectives by providing a barrier movement control apparatus, the apparatus that has: a) an ultrasonic measurement device positioned to measure a length of a barrier; b) an analysis unit to determine various characteristics of the barrier in communicative connection with the ultrasonic measurement device which generates a state signal based on information obtained from the ultrasonic measurement unit; and c) a barrier control unit responsive to a state signal from the analysis unit which controls the barrier operational characteristics based on the state signal.

In an additional aspect of the present invention ultrasonic measurement device can be selected from a group of: a master and slave unit positioned for measurement of the length of the barrier; a transceiver reflector unit positioned for measurement of the length of the barrier; or a transmitter unit, reflector unit and sensor unit positioned for measurement of the length of the barrier.

BRIEF DESCRIPTION OF THE DRAWINGS

The invention will be better understood by an examination of the following description, together with the accompanying drawings, in which.

DETAILED DESCRIPTION OF THE PREFERRED EMBODIMENT

The present invention provides a method and apparatus that sets the optimal operational speed of a security gate or barrier, by providing a system that upon installation determines the length and if necessary the mass of the gate. Length of the gate is determined by use of ultrasonic based measuring devices to be discussed in detail below. Mass can be determined in a variety of different ways. Some of the systems and methods that can be used to determine mass are disclosed in co-pending patent applications owned by the applicant herein with Ser. Nos. 10/280,523 and 10/280,524 filed on Oct. 24, 2002, which applications are incorporated herein by reference as if set forth herein at length.

Figure 1:
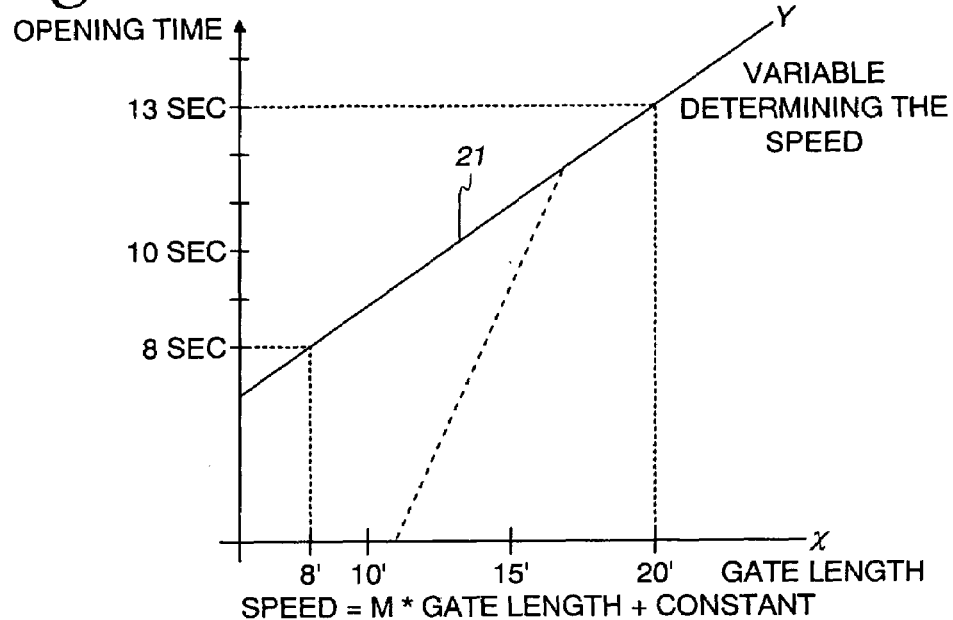
FIG. 1 is a graph of a gate speed profile for gate length based a calculation using gate length and mass.

The system includes a method of calculating an optimal speed graph 21 as depicted in FIG. 1. In FIG. 1 speed of movement is set out along the Y-axis and gate length is set along the X-axis In its simplest form the optimal speed graph 21 of a gate is a straight-line graph that is determined by a combination of the mass M of a particular gate, its length L and a constant K. Thus speed is calculated by the system with the following equation:

Speed=$M*L+K$ (w/o mass)

Speed=$M L W+K$ (With Mass [W])

The system based on the above equation then calculates a speed graph as depicted in FIG. 1 and based on this graph and the gate length, sets the maximum speed the gate can safely and optimally operate at.

For example, in one setup, the system could be calibrated so that a gate eight feet long, would optimally move between the open and closed position in eight seconds, and optimally, a gate twenty feet long would move between the open and closed positions in thirteen seconds. Based on the set values for an 8 foot and 20 foot gate, the mathematical formula for a straight line can be calculated as depicted in FIG. 1. In this situation we would consider the "proportional linear operator" as a slope of the line. This would be calculated by as follows; where X equals the distance and Y equals the time of movement:

$$M = \text{Slope} = \frac{13 \text{ sec} - 8 \text{ sec}}{20 \text{ ft.} - 8 \text{ ft}} = 0.416 \frac{\text{sec}}{\text{ft}}$$

Since we are working with an equation for a straight line, i.e. Y=MX+B the value for B such as an offset would have to be calculated, and that would be as follows:

$B$=offset=$-(M \cdot \text{length @8 sec} - 8 \text{ sec})$=4.672

$$DesiredSpeed = \left(0.416 \frac{\text{sec}}{\text{ft}}\right) \cdot (legthofgate) + 4.672$$

Figure 1A:
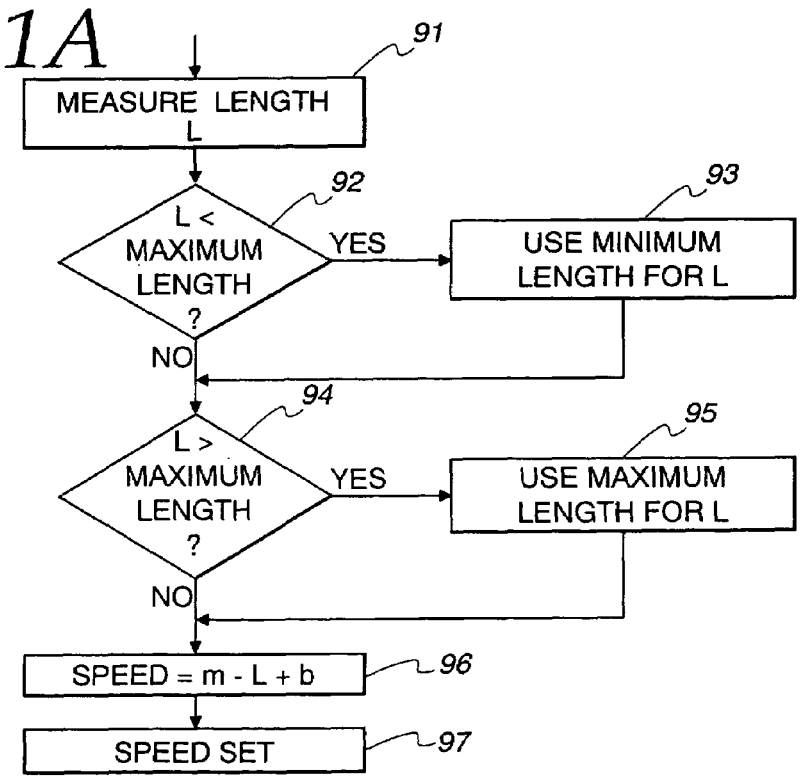
FIG. 1A is a flowchart of a method for determining and setting speed based on the graph in FIG. 1

The above formula would have two constants proportionality to M in seconds per feet and an offset term of B in seconds. The values of M and B will be determined by the maximum and minimum desired speed of operation for maximum and minimum length of the gate. A CPU would then be able to calculate the speed as indicated in the flowchart FIG. 1A. The measure of the gate length would be determined 91. If the gate length was less than the minimum length the CPU would use the minimal length for a calculation of L 93. However, if the gate was not less than the minimal length, it would move to step 94, and if it determined it was a maximum length or greater it would use the maximum length for L, thus the speed 96 would be accordingly calculated. There, obviously, being a lower limit of eight seconds for a gate eight feet or shorter, and there would be a maximum speed of thirteen seconds for a gate of twenty feet or longer. For lengths in between, the system would set the speed as indicated in the graph in FIG. 1 by the method set forth in FIG. 1A.

The system and method of the present invention uses ultrasonic or ultrasound transmissions to measure the length of a gate. Ultrasonic or ultrasound, as is well known in the art, are sound wave transmissions beyond the range of the human hearing. Such sound transmissions are greater than 20,000 Hz. Ultrasound or ultrasonic transmissions offer a number of advantages in that they are not substantially affected by weather, visibility and can be made benign with respect to human contact. Additionally, they offer a very precise measurement tool. A detailed description of ultrasonic or ultrasound transmitters, transceivers or reflective medium is not included herein since these are well known in the art.

Figure 2A:
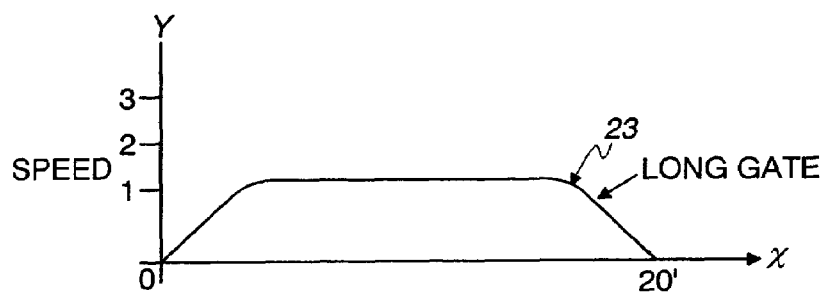
FIGS. 2A, 2B and 2C are three examples of gate time movement profiles based on the length of the gate.
Figure 2B:
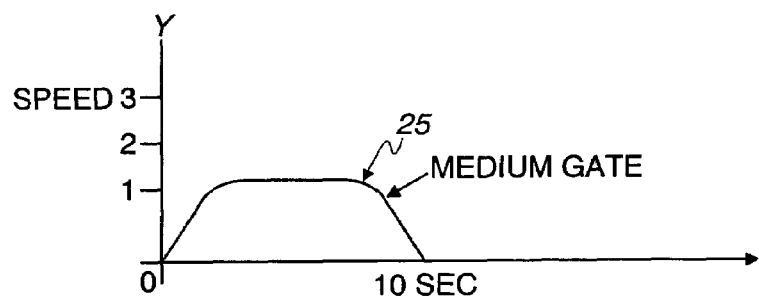
Figure 2C:
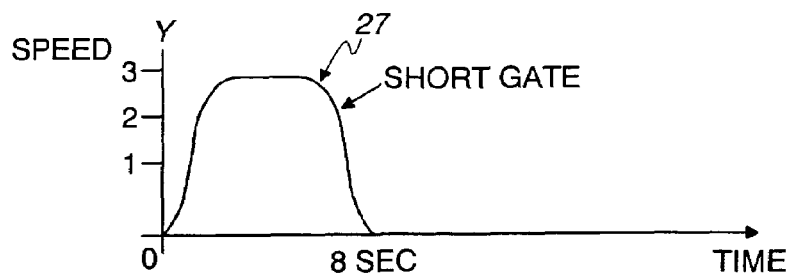

FIG. 2 provides three graphs of speed of operation profiles of gates of varying length in sub FIGS. 2A, 2B and 2C. Speed of operation of each gate is set out along the Y-axis and the time each gate takes to move between the open and closed position or visa versa is set out along the X-axis. As can be seen the longest gate 23 FIG. 2A takes 20 seconds to move between the open and closed position. Also, its top speed as can be seen from graph is only at point 1 on graph 2A. By contrast the profile of operation of a medium sized gate 25 depicted in FIG. 2B moves between the open and closed position within 10 seconds and reaches a higher speed at point 2. Finally, the shortest gate 27 FIG. 2C reaches a faster speed at point 3 and moves between the closed and open position within 8 seconds.

Figure 3:
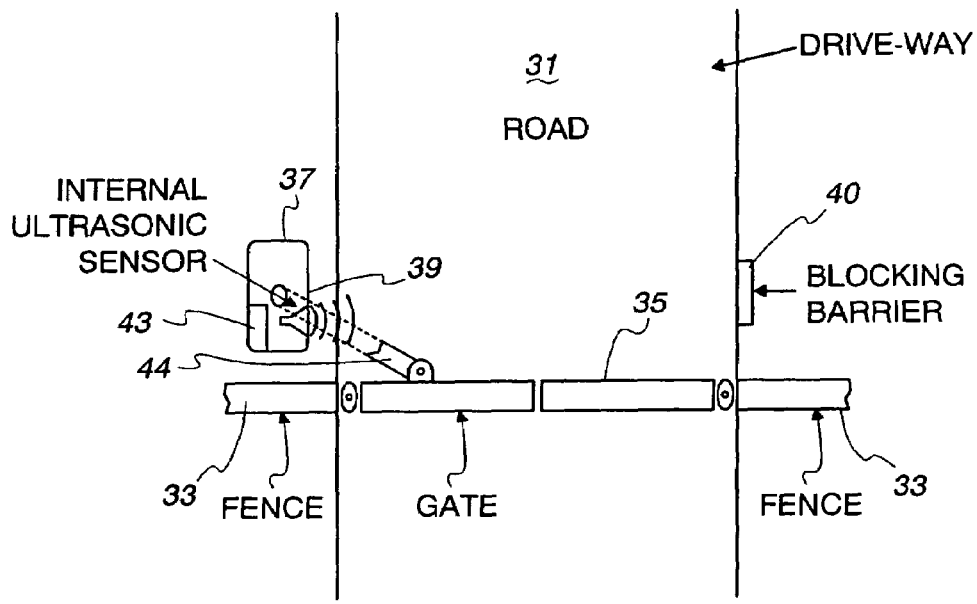
FIG. 3 is a schematic diagram of a first example of an installation of the ultrasonic measurement device of the present invention.

FIG. 3 provides one view of an installation of one version of the ultrasonic measuring device of the present invention with road or driveway 31, fixed fence 33, movable gate 35 and gate controller 37. Additionally, an ultrasonic transceiver 39 is positioned on the gate controller 37 and an ultrasonic reflective medium 40 is positioned on the opposite side of gate 35. Thus, when ultrasonic transceiver 39 generates ultrasonic waves, which it will do during installation or any time there after, it will reflect of off reflective medium 40 and be reflected back to transceiver 37. In the typical case an analysis unit 43 will determine the length of the gate by the travel time of the waves between transceiver 39 and reflective medium 40. The gate motor and gear system that translates the power generated by the motor to move arm 44 to swing open gate 35 is not shown since such aspects of the system are well known in the art.

Figure 4:
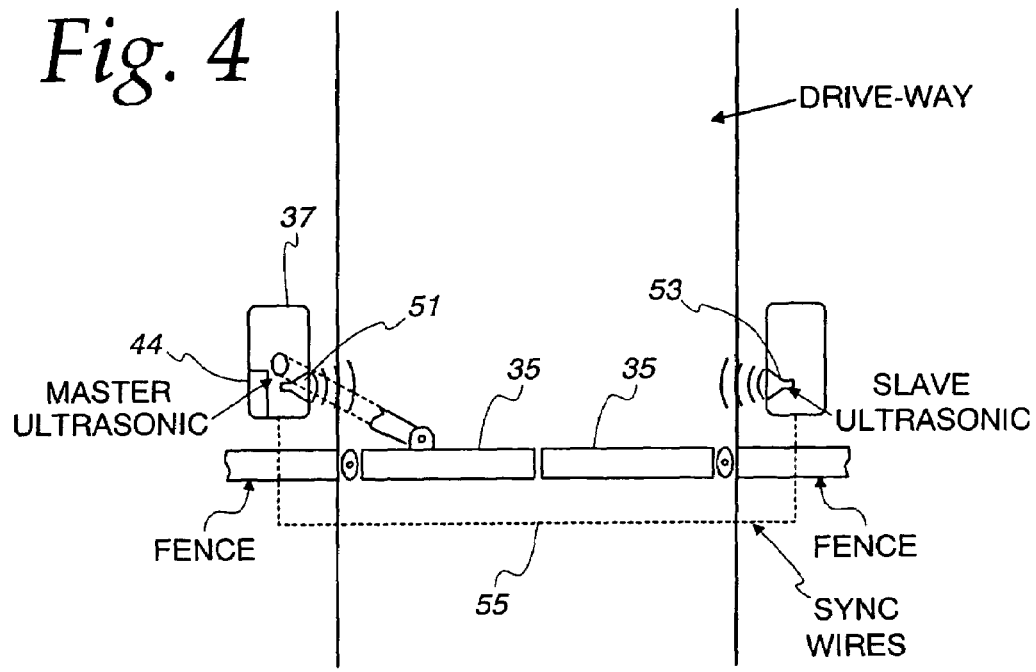
FIG. 4 is a schematic diagram of a second example of an installation of the ultrasonic measurement device of the present invention.

FIG. 4 depicts another version of the ultrasonic measurement device. Only the aspects of the device depicted in FIG. 4 that are different from FIG. 3 are given new reference numbers the rest are the same as FIG. 3. In FIG. 4 an ultrasonic transmitter 51 is positioned on gate utility box 51and beams ultrasonic waves towards slave unit 53 located at the other end of gate 35. Slave unit 53 is communicatively connected by line 55 to master transmitter unit 51. Upon receipt by slave unit 53 of ultrasonic transmissions slave unit 53 transmits this information to master unit 53 by connection 55. Based on this information analysis unit 44 can calculate the length of the gate. In FIG. 4 gate 35 is a double swinging gate.

Figure 5:
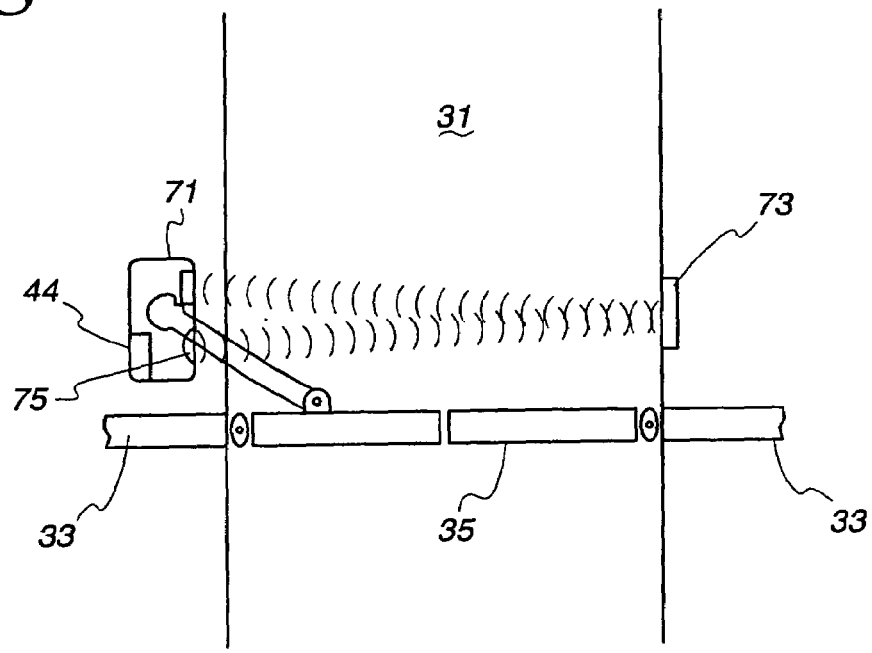
FIG. 5 is a schematic diagram of a third example of an installation of the ultrasonic measurement device of the present invention.

FIG. 5 depicts a third version of the ultrasonic measuring device in this case it consists of an ultrasonic transmitter 71, reflective medium 73 and a separate ultrasonic sensor 75. The information on the time it takes the ultrasonic signal to move from transmitter 71 reflects off of 73 and is received by sensor 75. Analysis unit 44 based on this information can make a determination as to length of gate 35.

Figure 6:
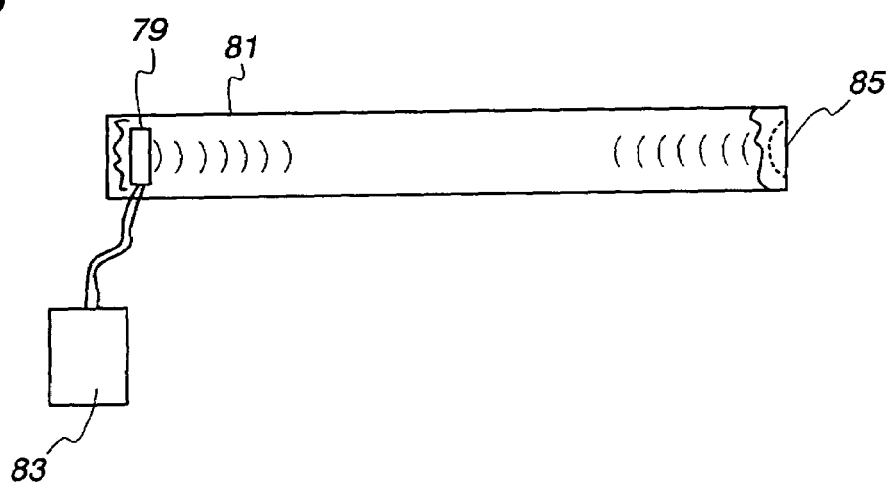
FIG. 6 provides a cut away a hollow gate strut with an ultrasonic measurement incorporated therein.
Figure 7:
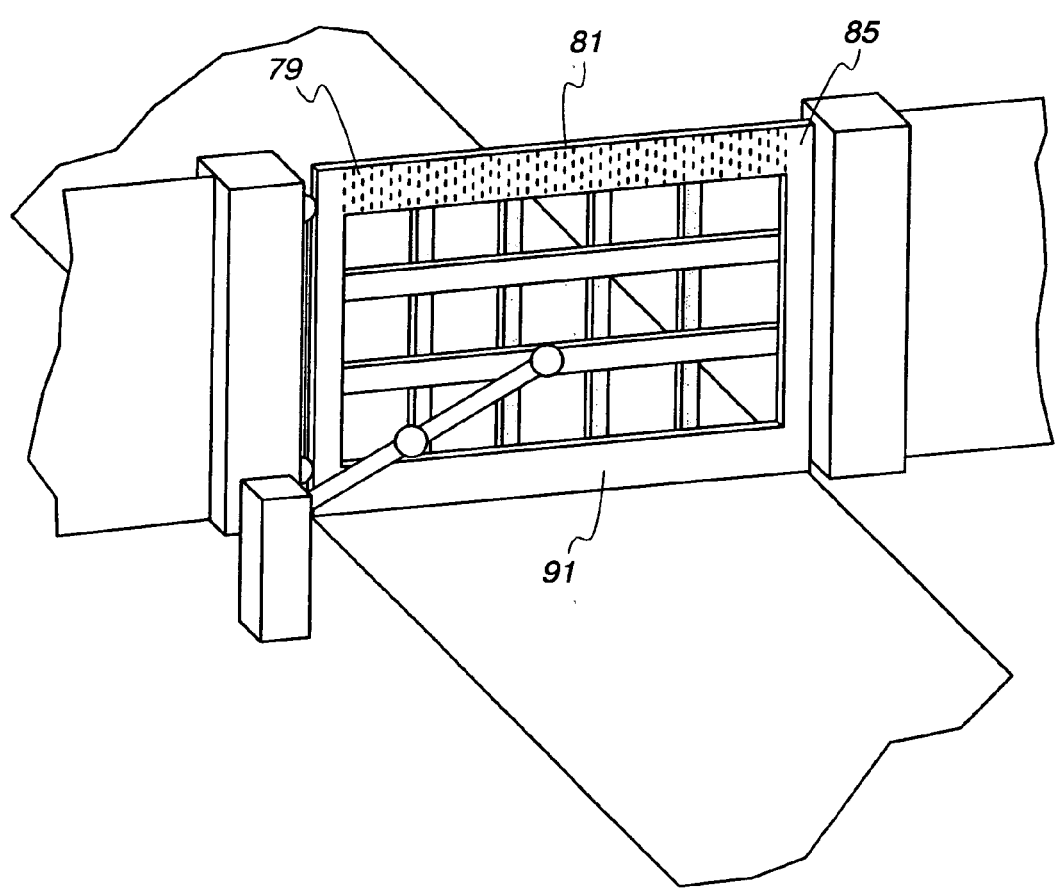
FIG. 7. is schematic diagram of a security gate installation that incorporates the strut of FIG. 6.

FIG. 6 depicts another variation that the set up the ultrasonic measurement device can take. In this variation a transceiver 71 is located in the hollow strut of the gate structure itself. FIG. 6 being a cut away view of a gate strut. The ultrasonic waves generated by transceiver 79 would travel down strut 81 reflect off of the inside end 85 and the echo would be detected by transceiver 79. Analysis unit 83 would make the appropriate calculations to determine length and communicate it to the gate operator. FIG. 7 is a view of a gate 91 that is formed in part by strut 81. Transceiver 79 would transmit ultrasonic waves down strut 81 to its end 85 that would reflect it back to transceiver 79 that would pick up the reflected waves. In many cases gates of this type are made of extruded aluminum with a hollow core to provide a strong durable gate that is also relatively light and easy to move.

Another method for calculating the optimal speed for opening and closing the gate based on its length which uses a straight line approximation as used above is as follows:

Given the formula: $Y=M*X+B$ for a straight line equation

Where Y=calculated point

And $M=(Ymax-Ymin)/(Xmax-Xmin)$

Given Y=min and max time (or alternatively torque, motor speed, etc.)

And X=min and max length of gate (or alternatively mass * length)

And $B=Ymax-M*Xmax$

The optimal speed can be calculated between the minimum and maximum speeds once the length of the gate is known. If the equation's X component is written for length and mass, then mass is determined and multiplied by the length. For this example, we will just use length and enter Y as time in seconds.

Given: Ymax=15 seconds for gate length Xmax of 20 feet and Ymin=8 seconds for gate length Xmin of 6 feet.

$M=(15-8)/(20-6)=7/14=0.5$ $B=15-(0.5*20)=15-10=5$

If the gate length X is determined to be 12 feet, then the optimal speed $Y=0.5*12+5$ is calculated to be 11 seconds. Keep in mind that Y is not restricted to time in seconds but could be calculated to produce desired torque or motor speed or any other value that will accomplish the optimal time to open or close the gate.

A software example in psuedo code is provided:

```
#define M        0.5
#define B        5
#define Xmax 20
#define Xmin     6
GetGateLength (X);      //read the gate length - > X
If (X > Xmax)           // check for min and max lengths
    X = Xmax;
If (X < Xmin)
    X = Xmin;
GateTime = X * M + B;   //calculate optimal speed
OpenGate (GateTime);    // move the gate at calculated speed
```

While the invention has been particularly shown and described with reference to a preferred embodiment thereof, it will be understood by those skilled in the art that various changes in form and detail may be made to it without departing from the spirit and scope of the invention.

We claim:

1. A barrier movement control apparatus, the apparatus comprising:
   an ultrasonic measurement device positioned on the movement control apparatus to measure a length of a barrier;
   an analysis unit in communicative connection with the ultrasonic measurement device to determine the length of the barrier and to generate a state signal based on length information obtained from said ultrasonic measurement unit; and
   a barrier control unit responsive to a state signal from said analysis unit to control the barrier operational characteristics based on said state signal.

2. The apparatus of claim 1 wherein said ultrasonic measurement device is selected from a group of: a master and slave unit positioned for measurement of the length of the barrier; a transceiver reflector unit positioned for measurement of the length of the barrier; or a transmitter unit, reflector unit and sensor unit positioned for measurement of the length of the barrier.

3. The apparatus of claim 1 including a device for determining a mass of the barrier, which said analysis unit includes in said state signal sent to said gate controller.

4. The apparatus of claim 1 wherein said operational characteristics include a speed of operation of the barrier.

5. The apparatus of claim 4 wherein said speed is inversely proportional a length of the barrier.

6. The apparatus of claim 1 wherein the barrier is selected from a group of; a sliding gate, a swinging gate, a barrier that moves in a vertical direction or a door.

7. The apparatus of claim 1 wherein said ultrasonic measurement unit comprises an ultrasonic transducer positioned at a first end of the barrier and an unit reflective of ultrasonic wave positioned in reflective communication with said transducer at a second end of the barrier.

8. The apparatus of claim 1 wherein said ultrasonic measurement unit comprises an ultrasonic master unit capable of transmitting ultrasonic wave positioned at a first end of the barrier and an ultrasonic slave unit receptive of ultrasonic wave positioned in a receptive position with said master unit at a second end of the barrier and said master unit is a second non ultrasonic communicative link with said slave unit to thereby receive confirmation of receipt of ultrasonic signals by said slave unit.

9. The apparatus of claim 1 wherein said ultrasonic measurement unit comprises an ultrasonic transmitter positioned at a first end of the barrier and an unit reflective of ultrasonic wave positioned in reflective communication with an ultrasonic sensor positioned adjacent said ultrasonic transmitter at said first end of the barrier.

10. The method of claim 9 wherein said pre-set range from which the optimal speed of a gate is set which has a length determined to be between the maximum and minimum pre-set gate values is taken from a graph of a function, said function being determined by a one to one relation between the length of the gate and an optimal speed of operation.

11. The method of claim 9 wherein the step of determining the length of the gate comprises the step of using an ultrasound device to determine said length.

12. A method for setting an optimal security gate speed, said method comprising the steps of:
   ultrasonically measuring a the length of a security gate;
   determining if the measured length of the security gate is less than a minimum length, and if it is, setting an operational speed of said gate, and a pre-set maximum speed;
   determining if the security gate is greater than a pre-set maximum length, and, if it is, setting the pre-determined speed of the gate at a pre-set minimum speed; and
   determining if the security gate has a length between the pre-set maximum and the preset minimum, and if it does, setting the operational speed of the gate at a rate equivalent of a pre-set value picked from a range of values, determined by the measured length of said gate.

13. A method of controlling barrier speed in a barrier movement system comprising:

mounting on the barrier movement system an ultrasonic device for measuring a length of the barrier;

calculating a barrier movement speed in response to the length of the barrier measured by the mounted ultrasonic device; and moving the barrier at the speed calculated in the calculating step.

14. A method in accordance with claim 13 wherein the calculating step calculates a predetermined maximum speed when the barrier length measured by the mounted ultrasonic device is less than a predetermined minimum length.

15. A method in accordance with claim 13 wherein the calculating step calculates a predetermined minimum speed when the length of the barrier exceeds a predetermined maximum length.

16. A method in accordance with claim 13 comprising measuring a mass of the barrier.

17. A method in accordance with claim 16 wherein the calculating step calculates barrier speed in response to the measured mass.

* * * * *

UNITED STATES PATENT AND TRADEMARK OFFICE
CERTIFICATE OF CORRECTION

| | |
|---|---|
| PATENT NO. | : 7,176,647 B2 |
| APPLICATION NO. | : 10/386758 |
| DATED | : February 13, 2007 |
| INVENTOR(S) | : Walter Parsadayan and Wayne C. Hom |

It is certified that error appears in the above-identified patent and that said Letters Patent is hereby corrected as shown below:

TITLE PAGE:

Item (54) -- Change "Light-Emitting Device Having a Phosphor Particle Layer with Specific Thickness" to -- Gate Operator With Speed and Torque Control --.

SPECIFICATION:

Column 1, Beginning Line 1 -- Change "Light-Emitting Device Having a Phosphor Particle Layer with Specific Thickness" to -- Gate Operator With Speed and Torque Control --.

IN THE CLAIMS:

Claim 12, Column 6, Line 56 -- after "measuring" delete "a"

Signed and Sealed this

Twenty-fourth Day of April, 2007

JON W. DUDAS
*Director of the United States Patent and Trademark Office*